Figure 1:
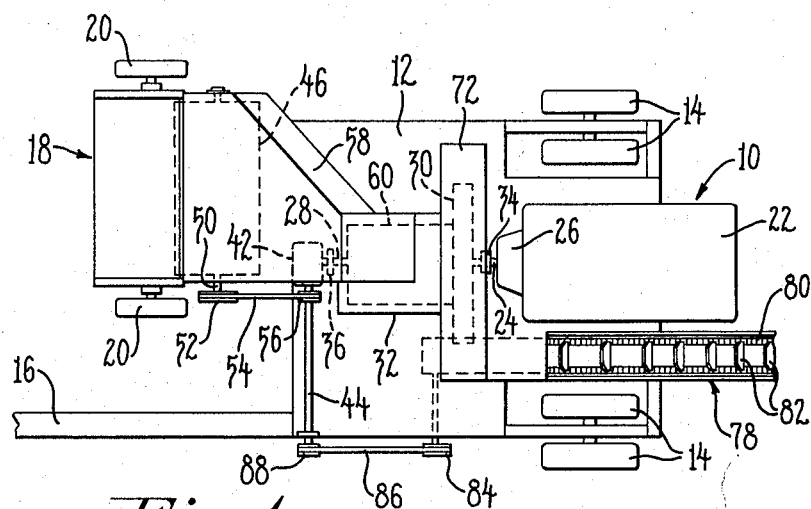

Dec. 1, 1964 M. H. PETERSON ETAL 3,158,975
APPARATUS FOR WAFERING HAY
Filed May 14, 1962

INVENTORS.
MERLE H. PETERSON &
STANLEY L. LAWRENCE
BY Barnard & Mc Glynn
ATTORNEYS.

3,158,975
APPARATUS FOR WAFERING HAY
Merle H. Peterson and Stanley L. Lawrence, Livonia, Mich., assignors to Massey-Ferguson, Inc., Detroit, Mich., a corporation of Maryland
Filed May 14, 1962, Ser. No. 194,355
2 Claims. (Cl. 56—1)

This invention relates to an apparatus for producing hay wafers and, in particular, to an improved apparatus for field wafering forage crops into hay wafers of substantial uniform quality, constituency, length, shape and density for livestock feed.

In recent times, apparatus have been devised for field wafering forage crops into hay wafers comprising a rotary flail-type crop pick-up mechanism for supplying hay, preferably preconditioned or processed, finely chopped, mixed and blended hay from a windrow within a field, to a wafering chamber which communicates with the entrance ends of an annular series of axially open radially extending die cells. A rotary hay compressing means including a drive shaft extends through the wafering chamber substantially coaxially with the annular series of die cells, and further includes roller means mounted on the drive shaft for travel in a rotative path within the wafering chamber closely spaced to the entrance ends to the die cells so that hay received within the wafering chamber will be compressed or compacted into and through the die cells upon successive passes of the rotary compressing means applying force thereto. The wafering apparatus including the die cells and rotary compressing means cooperable therewith have been mounted transversely of a wheeled frame adapted to be hitched to a suitable prime mover, such as an agricultural tractor, and an engine has been mounted on the frame so as to extend transversely thereof forward of the aforementioned wafering apparatus. Pulley and drive belt means have drivingly coupled the power output shaft of the engine to the drive shaft of the rotary compressing means, while auxiliary pulley and drive belt means have coupled the drive shaft to the rotary flail-type crop pick-up mechanism aforementioned which has been coupled to the wheeled frame so as to extend laterally outwardly from the path of travel thereof and to an elevator type conveyor connected to the frame and disposed relative to the die cells of the apparatus to receive wafers ejected therefrom for conveying them to the rear of the wheeled frame.

In an apparatus of the type aforementioned, considerable power is required to drive the aforementioned rotary hay compressing means operable to compress or compact hay through the respective die cells of the apparatus, while relatively less power is required to drive the rotary flail-type crop pick-up mechanism and elevator type conveyor aforementioned. Thus, a relatively large pulley or flywheel has been utilized on one end of the drive shaft of the rotary compressing means for cooperation with a drive belt coupled to the output shaft of the forwardly located engine to supply adequate drive to the wafering apparatus, while the flywheel has been coupled by additional belt means to the rotary flail-type crop pick-up mechanism which requires considerably less power. The other end of the drive shaft has been similarly coupled by pulley and belt means to the aforementioned conveyor means. In the interest of safety, protective guards must be provided for the aforementioned flywheel, pulley and belt means associated with the drive shaft which, in the final analysis, adds additional overall width to the apparatus detracting from its manueverability. In addition, the rotary flail-type crop pick-up mechanism, mounted as it has been laterally outwardly of the wheeled frame of the apparatus to which it is coupled, further contributes to the overall width of the apparatus and detracts from its maneuverability.

Thus, the present invention contemplates an improved apparatus of the general type aforementioned for making compressed hay wafers, and is particularly characterized by an engine mounted on the rear of a wheeled frame with its axis extending fore and aft thereof, and having a power output shaft directly coaxially coupled to one end of the drive shaft of a rotary hay compressing means also extending fore and aft of the wheeled frame in front of the engine and surrounded by an annular series of die cells. The other end of the drive shaft is coupled through belt and pulley means to a rotary flail-type crop pick-up mechanism coupled to the wheeled frame and extending generally forwardly of the path of travel and substantially within the lateral confines thereof, and also is coupled to a suitable elevator type conveying means to convey wafers ejected from the die cells. As a result, the output shaft of the engine delivers power directly coaxially to the drive shaft of the rotary compressing means without requiring or utilizing any intermediary pulley and belt means as has been the prior practice aforementioned, thereby effectively transmitting the large power requirements of the wafering mechanism and permitting the other end of the drive shaft to be coupled through pulley and belt means to various other instrumentalities associated with the apparatus, including the crop pick-up mechanism and conveyor means aforementioned, having relatively smaller power requirements. In addition, due to the substantially fore and aft alignment on the wheeled frame of the engine, rotary compressing means including the series of die cells cooperable therewith and the crop pick-up mechanism, the overall width of the apparatus is materially reduced thereby enhancing its maneuverability.

Figure 2:
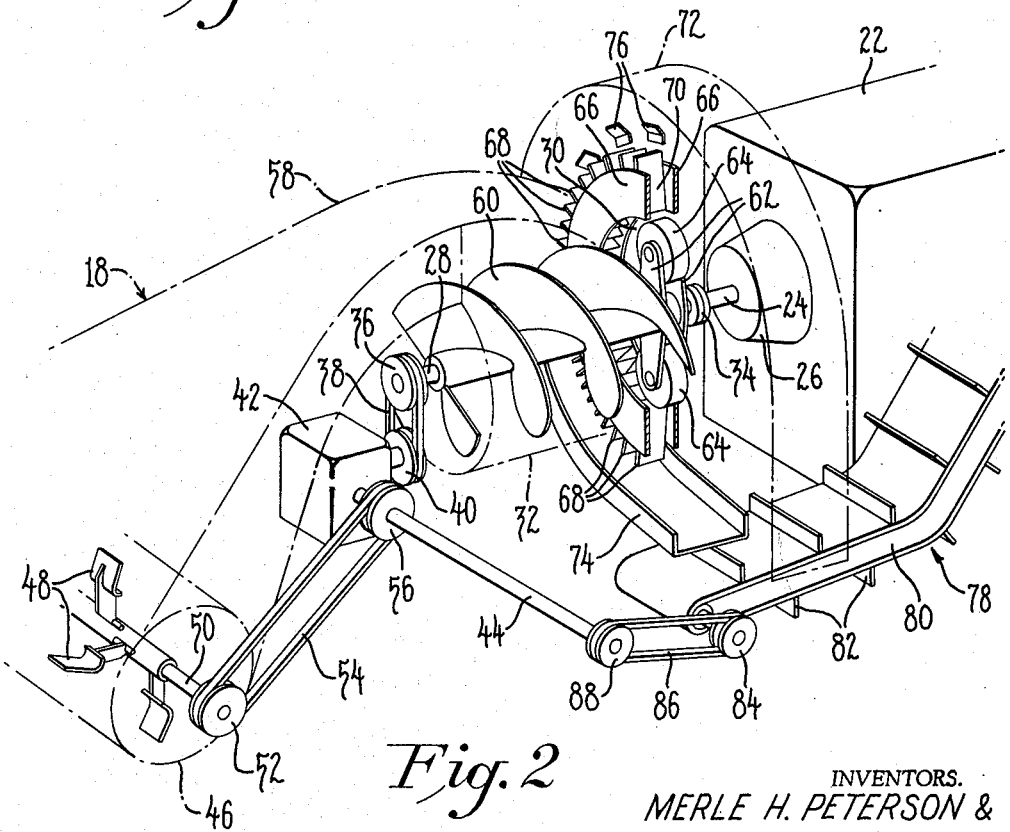

In order to facilitate an understanding of the invention, a preferred embodiment thereof will now be described with reference to the accompanying drawing in which:

FIGURE 1 is a top plan view of a hay wafering apparatus embodying the invention; and FIGURE 2 is an enlarged perspective view, partly in phantom and in section to illustrate certain details, of the apparatus of FIGURE 1.

Referring now to the drawings, the numeral 10 in FIGURE 1 generally indicates a hay wafering apparatus comprising a frame 12 equiped with ground-engaging wheel means 14 in the usual manner, and a drawbar 16 projecting from the forward end of the frame and adapted to be hitched in the usual manner to a suitable prime mover, such as an agricultural tractor, for drawing the frame along a field of mown hay. A pick-up mechanism for mown hay in the field is indicated generally at 18, is equipped with ground-engaging wheel means 20 in the usual manner and is suitably coupled to and extends from the forward end of the frame 12 in the path of forward travel of the latter and alongside of the drawbar 16.

A suitable power plant or engine 22 is mounted on and overhangs the rearward end of the frame 12 so as to extend in a fore and aft direction relative to the latter, and includes a power output shaft 24 projecting toward the forward end of the frame and driven through suitable gearing indicated schematically at 26. The output shaft 24 of the power plant or engine is coaxial with a drive shaft 28 suitably mounted for rotation in and extending through an annular wafering chamber 30 communicating with one end of a hopper 32 all of which are suitably mounted on the frame 12. Coupling means 34 drivingly couples the output shaft 24 of the power plant or engine to the input end of the drive shaft 28 exteriorly of but adjacent to the wafering chamber 30, while the other or output end of the drive shaft mounts a drive pulley 36 beyond and adjacent the hopper 32.

A pulley belt 38 conducts drive from the pulley 36 to a pulley 40 connected through suitable transfer gearing means 42 mounted on the frame 12 to a laterally projecting shaft 44 rotatably supported on the frame 12 and equipped with pulley means as will be described to drive various instrumentalities of the apparatus.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogeneous mass. As the apparatus is towed along the field, the hay mixture in a given windrow is adapted to be picked up in the pickup mechanism 18 which comprises a rotary flail mechanism 46 including a plurality of spaced projecting flails or arms 48 secured to shaft 50 rotatably driven by the pulley 52 and belt 54 connected to the pulley 56 on the aforedescribed shaft 44. Thus, as the apparatus is towed along the field of hay, the rapidly rotating flails or arms 48 are operable to direct the homogenized hay in an air stream into the delivery chute 58 of the pick-up mechanism which delivers the hay through a suitable opening in a wall of the hopper 32.

A multiple flight feed auger 60 is secured on the drive shaft 28 within the hopper 32. Radially extending arms 62 have their central portions suitably rigidly secured to the drive shaft 28 for rotation therewith within the wafering chamber 30, and have journaled at the opposite ends thereof a pair of rollers 64.

A pair of oppositely spaced annular die plates 66 are suitably supported coaxially with the wafering chamber 30 and drive shaft 28, and an annular or circumferentially spaced series of die plates 68 are disposed therebetween to form an annular or circumferentially spaced series of radially extending axially open die cells 70 between the annular die plates 66 and adjacent die plates 68. As will be apparent, the axes of the respective die cells 70 are contained in a plane perpendicular to the axis of rotation of the drive shaft 28 or, in other words, a vertical plane with the apparatus traversing a horizontal surface. Furthermore, the annular series of die cells are substantially coaxial with the drive shaft, and each includes an entrance end communicating with the wafering chamber 30 and an exit end axially spaced therefrom which communicates with an enlarged housing or shroud 72 enclosing a substantial portion of the wafering chamber 30 and including a delivery chute portion 74 in a lower portion thereof. Preferably, the die cells 70 converge in cross section from their entrance ends to their exit ends. A wafer breaking and ejection plate 76 is associated with the exit end of each of the die cells and extends obliquely to the axis of the latter, whereby a column of compacted hay emerging therefrom will engage the ejecting plate and be broken into a wafer which is then ejected to one side of the wafering chamber within the housing or shroud 72 so as to fall to the bottom thereof.

As will now be apparent, the rollers 64 are positioned so as to be closely spaced to but not engage the entrance ends to the respective die cells 70. Thus, hay fed continuously by the auger 60 from the hopper 32 into the wafering chamber 30 is laid across the entrance ends of the respective die cells and the rollers compress the hay and force it into and through the respective die cells upon successive rotative passes of the rollers. As the rollers continue to rotate within the wafering chamber, hay is continuously compressed and forced into and through the respective die cells to form columns of compacted hay extending between the path of rotation of the rollers and the wafer breaking and ejection plates 76 adjacent the exit ends of the respective die cells. As a result of this process, the hay within each die cell is compacted and compressed therein into columns of substantially uniform quality, constituency, shape and density, the breaking and ejection plates acting to engage the end of the compacted column of hay emerging from the exit ends of the cells to break and eject therefrom successive wafers or hay of substantially uniform length.

The wafers of hay so ejected from the die cells within the enlarged housing or shroud 72 either fall directly upon the elevator type conveyor indicated generally at 78 or onto the delivery chute portion 74 of the housing or shroud which terminates directly over the conveyor. In either event, the wafers are ultimately fed onto the elevator type conveyor which includes belt means 80 equipped with spaced conveyor paddles 82 which pick up the wafers and convey them from the apparatus preferably into a trailing conveyance. The belt means 80 of the conveyor is adapted to be driven by a shaft coupled to the pulley 84 and driven from a belt 86 entrained about another pulley 88 on the shaft 44.

From the foregoing description, it will now be apparent that the homogenized mixture of hay including chopped, finely blended and mixed stems and leaves is delivered through the chute 58 to the hopper 32 and fed therefrom into the wafering chamber 30 by the feeding and centrifugal action of the auger 60. The hay is then laid along the entrance ends of the respective die cells 70 and the rollers 64 compress and force the collection of hay into and through the die cells to compact the hay into dense columns which, upon engaging the breaking and ejection plates 76, are successively broken into wafers of substantially uniform length which are ejected within the housing or shroud 72 onto the elevator type conveyor 78 for disposal as desired. Furthermore, the horsepower from the power plant or engine 22 is supplied directly and coaxially to the drive shaft 28 through the coupling means 34 to drive the hay feeding, compressing and compacting instrumentalities secured thereon while, at the same time, the other end of the drive shaft is coupled exteriorly of the hopper 32 through the pulley means 36, 40, transfer gearing means 42 and shaft 44 to the other instrumentalities of the apparatus having much smaller horsepower requirements than the feeding, compressing and compacting mechanism contained within the hopper 32 and wafering chamber 30. Furthermore, the substantially fore and aft alignment of the engine, wafering mechanism and pick-up mechanism materially reduces the overall width of the apparatus to enhance its maneuverability.

The embodiments of the invention in which an exclusive property or privilege is claimed are defined as follows:

1. Apparatus for making compressed hay wafers from forage crops comprising, in combination a mobile frame adapted to be towed through a field, a series of die cells communicating with a wafering chamber, rotary hay compressing means mounted within said chamber and including a rotatable drive shaft, said compressing means being cooperable with said die cells to compress hay into and therethrough to form wafers, a power plant mounted on said frame and including a power output shaft disposed coaxially relative to said drive shaft, coupling means drivingly connecting said output shaft to said drive shaft, a hopper for receiving hay to be wafered, said hopper surrounding said drive shaft and communicating with said chamber on the side thereof opposite from said power plant, means mounted upon said drive shaft within said hopper for conveying hay therefrom into said chamber, said drive shaft extending entirely through said hopper and terminating in a power output end axially opposite from said coupling means, rotatable pick-up means mounted on said frame for picking up and delivering hay to be wafered to said hopper, and means drivingly connecting said power output end of said drive shaft to said rotatable pick-up means to drive the latter.

2. The apparatus according to claim 1 wherein said power plant is mounted on a rearward portion of said frame with said power output shaft and said drive shaft extending longitudinally of said frame in the direction of travel of the latter, hitch means secured to the forward end of said frame for pulling the latter, and in which said pick-up means is connected to and extends from the forward end of said frame in the path of forward travel of the latter.

References Cited in the file of this patent
UNITED STATES PATENTS

| | | |
|---|---|---|
| 2,811,004 | Borrow | Oct. 29, 1957 |
| 3,009,413 | Alexander | Nov. 21, 1961 |

FOREIGN PATENTS

| | | |
|---|---|---|
| 1,250,174 | France | Nov. 28, 1960 |